US005240777A

United States Patent [19]

Wacher

[11] Patent Number: 5,240,777

[45] Date of Patent: Aug. 31, 1993

[54] ELECTROSTATIC RECORDING MEDIA

[75] Inventor: Paul Wacher, Plano, Tex.

[73] Assignee: E. I. Du Pont de Nemours and Company, Wilmington, Del.

[21] Appl. No.: 834,020

[22] Filed: Feb. 11, 1992

[51] Int. Cl.[5] .................... B32B 3/00

[52] U.S. Cl. .................... 428/454; 428/195; 428/342; 428/537.5

[58] Field of Search .................... 428/323, 325, 328, 327, 428/211, 208, 457, 342, 454, 537.5; 427/466

[56] References Cited

U.S. PATENT DOCUMENTS 3,320,317 5/1967 Rogers et al. .................... 260/567.6
3,479,215 11/1969 Cavagna et al. .................... 117/201
3,586,478 6/1971 Neumann .................... 23/111
3,653,894 4/1972 Levy et al. .................... 96/1.7
3,847,661 11/1974 Hill et al. .................... 117/218
4,336,306 6/1982 Fellows .................... 428/341
4,739,003 4/1988 Barr et al. .................... 524/446
4,868,048 9/1989 Barr et al. .................... 428/328

*Primary Examiner*—Patrick J. Ryan
*Assistant Examiner*—W. Krynski

[57] ABSTRACT

An electrostatic recording media comprising a support having first and second surfaces, a conductive clay layer on the first surface of the support, at least one dielectric layer present on the conductive layer, and a non-clay conductivizing agent incorporated into the support from the second surface is described. The element is used in electrostatic imaging systems to produce images having improved density in relatively low humidities.

17 Claims, No Drawings

ELECTROSTATIC RECORDING MEDIA

FIELD OF THE INVENTION

This invention relates to electrostatic recording media and processes of use. More particularly, this invention relates to electrostatic recording media and their use in electrostatic imaging systems to obtain images having improved density during low humidity conditions.

BACKGROUND OF THE INVENTION

Electrostatic recording media are used in electrostatic imaging systems and comprise a support and a layer of dielectric material provided thereon. Electrostatic recording media are used to form images by first applying an electrical charge pattern on the dielectric material layer, for example by means of a stylus. The charge pattern is then rendered visible by the application of a toner or liquid developer comprising toner particles in a non-aqueous liquid. The image may be subsequently fixed to render it permanent by means known to those skilled in the art.

Various methods of manufacturing electrostatic recording media or dielectric papers are well known in the art. Typically, a non-aqueous solvent solution of a polymeric material may be coated onto the electrically conductive base paper. Alternatively, electrostatic recording media are prepared by extruding a polymeric material layer, i.e., the dielectric material layer, onto a support such as electrically conductive base paper.

The preferred method of manufacturing electrostatic recording media is to coat the dielectric material layer onto the electrically conductive paper from either an aqueous solution or an aqueous dispersion, for example a latex, containing a polymeric material. Although this method is environmentally safer, is less expensive and less complex than solvent systems, it still uses expensive electrically conductive paper.

The dielectric material layer can also be applied to a support or paper that is electrically non-conductive provided conductivity is produced in said support. Electrical conductivity of non-conductive paper has been achieved in the past by several different techniques. One technique employs inorganic salts which effectively penetrate paper which is porous. These materials function well under normal humidity conditions, however, they are not normally good conductors at relatively low humidities. A second technique involves the application of conductive polymers to both surfaces or sides of the paper by coating or size pressing. Electrically conductive papers prepared in this manner work well over a wide range of humidities and provided the dielectric coating is not water based. A barrier layer is also required between the aqueous dielectric coating and the electrically conductive paper to prevent contamination of the dielectric coating. The addition of a barrier layer results in an added cost to the final product and a loss of image density by virtue of reduced latent electrostatic field strength.

Another method of achieving electrical conductivity in non-conductive paper is to apply conductive clays to both sides of the non-conductive paper using a size press. Although this method provides papers having good conductivity, the approach is costly because conductive clay dispersions are expensive to make.

U.S. Pat. Nos. 4,739,003 and 4,868,048 issued to Barr et al. disclose an aqueous conductivizing composition for conductivizing paper and a conductive sheet material made from said composition. The aqueous conductive composition comprises a conductivizing agent and a binder. The conductivizing agent contains a synthetic hectorite clay which has been purified. Thus, an additional purification step and a binder is needed to make the conductive papers disclosed by Barr et al.

Accordingly, there is a need for an electrostatic recording media having good image performance, particularly at relatively low humidities, and which can be prepared simply and economically using preferably aqueous based coatings. These needs are met using the electrostatic recording media of the invention.

SUMMARY OF THE INVENTION

The invention concerns an electrostatic recording media comprising:

(a) a support having first and second surfaces;

(b) a conductive clay layer on the first surface of the support;

(c) at least one dielectric layer present on the conductive clay layer; and (d) a non-clay conductivizing agent incorporated into the support from the second surface.

Another embodiment of the invention concerns a process for preparing an electrostatic recording media which comprises:

(a) providing a support having first and second surfaces;

(b) applying a colloidal dispersion or solution of conductive clay onto the first surface of the support, to form a conductive clay layer;

(c) drying the conductive clay layer formed in step (b);

(d) applying at least one dispersion or solution containing a dielectric material onto the conductive clay layer to form a dielectric layer;

(e) drying the dielectric layer;

(f) applying a dispersion or solution containing a conductivizing agent to the second surface of the support wherein the conductivizing agent penetrates the support from the second surface; and (g) drying the second surface of the support.

DETAILED DESCRIPTION OF THE INVENTION

Surprisingly and unexpectedly, it was found that image performance, such as print density, is significantly improved, particularly at relatively low humidities, using an electrostatic recording media comprising a support having a layer of conductive clay coating on one side of the support and a non-clay conductivizing agent incorporated into the support from the opposite side. At least one dielectric coating is present on the surface of the conductive clay coating.

Accordingly, the electrostatic recording media of the invention comprises (a) a support having first and second surfaces, (b) a conductive layer on the first surface of the support, (c) at least one dielectric layer present on the conductive clay layer and (d) a non-clay conductivizing agent incorporated into the support from the second surface.

SUPPORT

The electrostatic recording media of the invention comprises a support layer. Any support known to one skilled in the art that has sufficient porosity to permit adsorption of the conductive clay and incorporation of the non-clay conductivizing agent into the support is suitable for practicing the invention. Particularly useful as supports are base papers which may be translucent or opaque. In either case, the base paper is preferably made from fairly wet-beaten stock. If the degree of beating is such as to impart translucency to the paper, the preferred nominal grammage of the paper is of the order of about 70 to about 75 g/m$^2$. Alternatively, if the stock, whilst still fairly wet-beaten, is such as to give rise to an opaque rather than translucent base paper, the preferred nominal grammage is about 50 to about 90 g/m$^2$. The base paper may, in either case, be calendered so as to enhance its smoothness. The grammage ranges indicated above are not limiting, and papers having a much wider range of grammage, for example, 40 to 120 g/m$^2$, may be conductivized, i.e., rendered conductive provided a conductive clay layer is present on one side of the paper and a conductivizing agent is incorporated into the paper from the other side. Some useful papers include 100% bleached hardwood Kraft and bleached softwood Kraft paper and mixtures thereof, wood free cotton vellum, and wood-containing paper made translucent by pulp beating or with the addition of additives.

Alternatively, a chemically transparentized paper may be used as a support instead of the natural translucent paper described above. Other useful supports include spun bonded olefins such as Tyvek ®, provided by E. I. du Pont de Nemours and Company, Wilmington, Del. and spun bonded polyesters such as Reemay ®.

CONDUCTIVE CLAY LAYER

The electrostatic recording media of the invention also contains a conductive clay layer which is present on one side of the support. Any conductive clay, known to one skilled in the art may be used in practicing the invention provided it is capable of adsorbing, i.e., penetrating to some extent, into the surface of the support when applied as a layer onto the support. Representative conductive clays include synthetic hectorite clays, montmorillonite clays, etc. Suitable synthetic hectorite clays and their method of preparation are disclosed in Neumann, U.S. Pat. No. 3,586,478 issued Jun. 22, 1971. Preferred synthetic hectorite clays include Laponite ® provided by Laporte Inorganics, Widnes, Cheshire, U.K.

Montmorillonite clays are complex hydrated aluminum silicates containing traces of alkali and alkaline earth metals such as sodium, magnesium and calcium along with other associated impurities such as iron and silica. Some common designations for clays in the montmorillonite group are bentonite and fuller's earth.

Inorganic fillers, binders and pigments known to those skilled in the art may be added to the conductive clay layer provided they are compatible with the conductive clay. By the term "compatible" it is meant that the pigments, binders, fillers, etc., do not hinder the adsorption of the clay into the paper.

It is preferred to use a synthetic hectorite conductive clay alone, i.e., without an additional binder, inorganic filler or pigment, and preferably in the form of an aqueous colloidal dispersion. If a montmorillonite clay is used as the conductive clay layer, it is preferred to have at least 5% binder present based on the total weight of the conductive clay layer components. This insures that the conductive clay layer is securely held on the paper and that the paper is not chalky in appearance. Suitable binders are disclosed in Levy et al., U.S. Pat. No. 3,653,894 issued Apr. 4, 1972.

To attain the conductivities acceptable for electrostatic printing applications, the amount of conductive clay in the layer should be at at least 95% by weight based on the total weight of the layer components. The coating weight of the conductive clay layer should be between 0.4 lbs/3000 sq. ft. to 4.0 lbs/3000 sq. ft., and preferably 0.4–2 lbs/3000 sq. ft.

Coating weights within these ranges provide a continuous, uniform layer.

DIELECTRIC LAYER(S)

At least one dielectric layer is present on the conductive clay layer. The dielectric layer comprises a polymeric material in an aqueous dispersion or solution. Preferably the dielectric layer also contains a particulate material, e.g., pigment, in an amount of about 10–60% by weight bf the dielectric coating, on a dry basis, and preferably about 45–60% by weight of the dielectric coating, on a dry basis. Some useful pigments include clay, calcium carbonate, silica, synthetic aluminosilicate, polymethylmethacrylate, polytetrafluorethylene, etc. Other additives such as defoamers, slip agents, and surfactants, may be added to improve coatability of the layer. Useful polymeric materials are disclosed in Hill et al., U.S. Pat. No. 3,847,661 issued Nov. 12, 1974. Preferred aqueous dielectric coatings include acrylic resins such as Joncryl ® provided by Johnson Wax, Racine, Wis.; Carboset ® provided by B. F. Goodrich, Cleveland, Ohio; and Rhoplex ® provided by Rohm and Haas, Philadelphia, Pa.

Alternatively, the dielectric layer comprises a polymeric material in a non-aqueous dispersion or solution. Particulate material such as those that can be added to aqueous dielectric coatings can also be added to non-aqueous dielectric coatings. Preferred solvent-based dielectric coatings include polyvinyl butyral, polystyrene, polystyrene acrylate copolymers, and all solvent-based acrylic polymers.

Conventional coating techniques may be employed for the application of the aqueous or solvent-based dielectric layer. For example, blade coating, reverse roll coating, Meyer bar coating or offset gravure coating may be used to apply the dielectric material onto the conductive layer. The coating weight applied is typically within the range 3 to 9 lbs/3000 sq. ft., preferably 4–6 lbs/3000 sq. ft. The dielectric coating may be applied as a single coating or as two separate applications of the same coating to achieve the desired thickness, smoothness and defect-free quality required for optimum imaging performance. Two different dielectric coatings having different dielectric compositions may also be applied to obtain defect-free coatings.

It is preferred that a conventional coating apparatus is used to apply the dielectric material onto the conductive clay layer, which is present on a support, so that a smooth continuous film is formed.

The dielectric coating used to make the electrostatic recording media of the invention, have dielectric properties which are relatively independent of the humidity of the surroundings and which are non-tacky and non-yellowing at most temperatures likely to be encountered in use. Further, the dielectric coating provides an intense, well defined image with no background discolorations due to pick-up of excess toner or liquid developer during processing.

NON-CLAY CONDUCTIVIZING AGENT

A non-clay conductivizing agent is incorporated into the second surface of the support, i.e., the surface opposite the surface on which the conductive clay layer was applied. The term "incorporated" as used herein means that the conductivizing agent must be capable of penetrating the support to promote sufficient conductivity.

The non-clay conductivizing agent may be selected from the group consisting of inorganic salts and electroconductive polymers which may be nonionic polymers, anionic polymers or cationic polymers. Some representative inorganic salts include sodium nitrate, sodium chloride, potassium nitrate, potassium chloride, calcium nitrate, calcium chloride, etc. These inorganic salts may be present in combination with humectants such as glycerol and glycols. Some representative nonionic polymers include polyvinyl alcohol, polyacrylamides, and polyethylene oxide. Some representative anionic polymers include:

(1) styrene/maleic acid copolymer salts having the general structure:

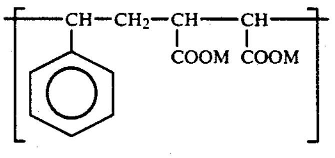

wherein M is an alkali metal; and (2) sodium polystyrene sulfonate having the general structure:

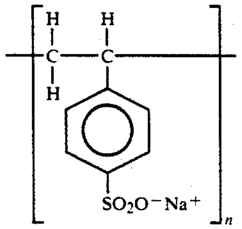

Sodium polystyrene sulfonates are available from National Starch and Chemical Corporation, Bridgewater, N.J. under the tradename Versa TL.

Some representative cationic polymers include Polyvinylbenzyl ammonium chloride available as Merquat ®100 from Merck Co., Rahway, N.J.; Conductive Polymer 261 from the Calgon Corporation, Pittsburgh, Pa.; and Agefloc ® from C.P.S. Chemical Co., Old Bridge, N.J. Representative quaternary ammonium salt derivatives of polystyrene include Chemistat ® 6300H provided by Sanyo Chemical Industries. Representative quaternary amine acrylate copolymers include Alcostat ® 567 available from Allied Colloids, Inc.

Other quaternary ammonium compounds may be used as the conductivizing agent provided their surface tension and viscosity are adjusted to allow for their penetration into the paper. If the viscosity is too high, inefficient absorption is obtained. Quaternized polyethylene imines disclosed by Cavagna et al., U.S. Pat. No. 3,479,215 issued Nov. 18, 1969, and quaternized polyepichlorohydrin disclosed by Rogers et al., U.S. Pat. No. 3,320,217 issued May 16, 1967 are useful as conductivizing agents in practicing this invention.

Additives such as pigments, surfactants, and alcohols known to one skilled in the art, may be added to the conductivizing agent to improve penetration of the conductivizing agent into the paper, and to adjust viscosity and surface tension. Suitable pigments include clay, calcium carbonate, silica, synthetic aluminosilicate, polymethylmethacrylate, polytetrafluorethylene, etc. The amount of the conductivizing agent should be 20–100% by weight, preferably 40–80% by weight, based on the total weight of the non-clay conductivizing agent containing layer components. The amount of the pigment and other additives should be 0–80% by weight, preferably 20–60% by weight, based on the total weight of the non-clay conductivizing agent containing layer components.

Conventional coating techniques may be employed for the application of the non-clay conductivizing coating. Such techniques include, for example, blade coating, reverse roll coating, Meyer bar coating or offset gravure coating. The weight of the coating applied is typically within the range of 1–4 lbs/3000 sq. ft. and preferably 2–3 lbs/3000 sq. ft.

DISPERSION PREPARATION AND COATING

A process is provided for preparing an electrostatic recording media which comprises:

(a) providing a support having first and second surfaces;

(b) applying a colloidal dispersion or solution of conductive clay onto the first surface of the support to form a conductive clay layer (c) drying the conductive clay layer (d) applying at least one dispersion or solution containing a dielectric material onto the conductive clay layer to form a dielectric layer;

(e) drying the dielectric layer;

(f) applying a dispersion or solution containing a conductivizing agent to the second surface of the support wherein the conductivizing agent penetrates the support from the second surface; and (g) drying the second surface of the support.

Dispersions of the conductive clay, dielectric and conductivizing agent are generally prepared with an aqueous solution as the dispersion medium. The dispersion containing the dielectric material may be prepared with a non-aqueous solution as the dispersion medium provided the dispersions of conductive clay and conductivizing agent are prepared from an aqueous solution.

The dispersion or solution containing the conductive clay is prepared by mixing the conductive clay and other suitable additives in a dispersion medium, preferably water. The mixing is carried out in a grinding device such as a ball mill; a sand mill such as a horizontal sand mill; a Planetary Ross Mixer; an attritor; a Cowles mixer, or a Kady Mill. Preferably a Cowles mixer or Kady Mill is used to prepare the dispersion. The choice of mixing devices depends on the amount of the dispersion to be prepared. The dispersion or solution is subjected to continuous grinding until uniform mixing is achieved.

The dispersion containing the dielectric material and the dispersion containing the conductivizing agent are prepared separately by grinding an aqueous resin (for preparation of an aqueous dielectric coating) and a conductivizing agent in one of the mixing devices identified above, until a uniform dispersion is achieved. Generally, a uniform dispersion is achieved when the desired particle size (about No. 6) is obtained as measured by a Fineness of Grind Gage No. 5251, available from the Precision Gage and Tool Co., Dayton, Ohio.

The dispersions containing conductive clay, dielectric material and conductivizing agent are each applied, preferably coated, using any conventional coating apparatus, onto a support, preferably paper. First, the dispersion containing the conductive clay is applied to the support. The amount of conductive clay present in the conductive clay layer is about 0.4–4 lbs/3000 sq. ft., preferably 0.4–2 lbs/3000 sq. ft. After drying the conductive clay layer, an aqueous dispersion or solution containing the dielectric material is applied, preferably coated, onto the dried first applied layer followed by drying under conditions specified below. The dielectric compound in the coated layer is present in the amount of 3–9 lbs/3000 sq. ft., preferably 4–6 lbs/3000 sq. ft. At least one additional dielectric layer may be applied, preferably coated onto the first applied and dried dielectric layer. An aqueous dispersion of the conductivizing agent is then applied, preferably coated onto the second surface of the paper at a coating weight of 1–4 lbs/3000 sq. ft., preferably 2–3 lbs/3000 sq. ft. and dried to give an electrostatic recording media having the moisture content indicated below.

Following application of each dispersion, the recording media is dried so that the exit temperature of the coated media is about 210° F. for the conductive clay layer, about 200° F. for the dielectric layer applied over the conductive clay layer, and between 130°–160° F. for the conductivizing agent containing dispersion to achieve the desired moisture content. There can be more than one dielectric layer applied to the conductive clay layer. A subsequent application of a dispersion or solution containing an aqueous dielectric material would have an exit temperature of about 190° F. The moisture content of the exiting fully coated web is maintained at approximately 5.5–8.0%, preferably 6.5–7.5%.

Additional dielectric layers may be applied to the dried recording element thus described to impart different surface characteristics such as gloss, smoothness, color, or resistance to inorganic or organic solvents. The outermost dielectric layer may also contain compounds selected from the group consisting of pigments, waxes, higher fatty acid metal salts, optical brighteners, and mixtures thereof.

The electrostatic recording media of the invention exhibit improved image performance in conditions of relatively low humidity. Images produced from such recording media exhibit improved density and reduced curl response.

In addition, compared to conventional electrostatic recording media, the electrostatic recording media of the invention require only an efficient conductive clay layer and a less expensive conductivizing agent, thereby eliminating the need for a separate barrier layer.

EXAMPLES

The following examples further illustrate, but do not limit, the invention. The parts and percentages are by weight unless otherwise indicated.

Coatings "A" through "G" were prepared according to the following procedure:

Coating "A"

22 7 kg of Laponite® RDS, a synthetic hectorite conductive clay available from Laporte Industries, Cheshire, U.K., was dispersed in 136 kg of deionized water in a 114 liter polyethylene container using a Model W-24 Cowles Dissolver (Morehouse Industries Inc., Fullerton, Calif.) operated at 500 RPM. The dispersion was carried out for 20 minutes, after which an additional 22.7 kg of deionized water was added. The dispersion was continued for an additional 5 minutes. Dispersion was considered complete when the Brookfield (Model RVF-100 Brookfield Viscometer at 100 RPM with a No. 2 spindle) viscosity was constant in the range of 40–45 cps at 49° C. The dispersion was cloudy in appearance, and had a Brookfield viscosity of 42 cps at 49° C. The percentage of coating solids present in the dispersion was 11.68% as determined gravimetrically using a Model AVC-80 Moisture/Solids Analyzer available from CEM Corporation, Matthews, N.C.

Coating "B"

22.7 kg of Laponite® S, a synthetic hectorite conductive clay available from Laporte Industries, was dispersed in 136 kg of cold tap water (ca. 16° C.) in a 114 liter polyethylene container using a Model W-24 Cowles Dissolver operated at 500 RPM. The dispersion was carried out for 20 minutes, after which an additional 22.7 kg of cold tap water was added. The dispersion was continued for an additional 5 minutes. The dispersion was considered complete when the Brookfield viscosity was constant in the range of 25–30 cps at 49° C. The dispersion was clear in appearance with a Brookfield viscosity of 28 cps at 49° C. The percentage of coating solids present in the dispersion was 12.38% as determined by using the Model AVC-80 Moisture/Solids Analyzer used to prepare coating "A".

Coating "C"

50.9 kg of Joncryl® 77, a 46% solids acrylic polymer emulsion (available from Johnson Wax Specialty Chemicals, Racine, Wis.) was placed in a 227 liter (60 gallon) capacity, unjacketed Model OC-30 Kady Mill (Kinetic Dispersion Corporation, Scarborough, Me.) fitted with a standard disperser. 25.4 kg of water was added and mixed with the emulsion for 5 minutes at 3600 RPM. 46.8 kg of ground $CaCO_3$ (Atomite®, available from ECC, International, Sylacauga, Ala.) was added, and the mixture dispersed for 20 minutes. 30 cc of defoamer (Bubble Breaker 3056A, available from Witco Chemical Corporation, Houston, Tex.) was added to the dispersion, and the dispersion was let down with an additional 50.9 kg of Joncryl® 77. The dispersion was mixed for 5 minutes at 3600 RPM, at which time 25.4 kg of water together with an additional 30 cc of the same defoamer used previously was added and the dispersion mixed for another 5 minutes at 3600 RPM. The dispersion was white in color, with a temperature of about 41° C., and had a fineness of grind of about 6, as determined with Fineness of Grind Gage No. 5251 (Precision Gage and Tool Co., Dayton, Ohio). Brookfield Viscosity was 30 cps at 49° C. (100 RPM, No. 2 spindle). The percentage of coating solids present in the dispersion was 46.5% as determined by using the Model AVC-80 Moisture/Solids Analyzer used to prepare coating "A".

Coating "D"

61.2 kg of Conductive Polymer E-2253, a 37% solids solution of polydiallyldimethyl ammonium chloride in water (available from Calgon Corporation, Pittsburgh, Pa.) was placed in a 114 liter polyethylene container fitted with a Model XJA-33 Lightnin Mixer (Mixing Equipment Co., Rochester, N.Y.). 4.5 kg of tap water (16° C.) was added and the solution mixed briefly at low speed. 113.5 g of a non-ionic surfactant (ethoxylated acetylenic diol) Surfynol ®440 (Air Products and Chemicals, Allentown, Pa.) was then added to the diluted solution. The mixture was mixed for 10 minutes at low speed to avoid generation of foam. The solution was clear in appearance, with most of the surfactant visible as a second, undissolved phase. The solution had a Brookfield viscosity of 34 cps at 49° C. and a solids content of 35.7% as determined by the same Model AVC-80 Moisture/Solids Analyzer used to prepare coating "A".

Coating "E"

13.6 kg of sodium polystyrene sulfonate, available as Versa-TL ® 70 (M.W. 70,000) from National Starch and Chemical Corporation, Bridgewater, N.J., was sifted into 31.7 kg of tap water in a 114 liter container and dissolved using the Cowles Dissolver used to prepare Coating "A" operated at 500 RPM for 20 minutes. The slightly warm solution was cooled to 25° C. 16.8 kg of this solution was then placed in a 19 liter plastic container and mixed with 32 g of Surfynol ®440 for ten minutes using a Model DS-1010 Lightnin Mixer. The solution was straw colored and clear, with most of the surfactant visible as a second, undissolved phase. The Brookfield viscosity was 140 cps at 21° C. and the solution contained 31.9% solids as determined by the Model AVC-80 Moisture/Solids Analyzer used to prepare coating "A".

Coating "F"

8.6 kg of a water white solution of Alcostat ®567 (nominally 30% solids as received), a quaternary amine acrylate copolymer available from Allied Colloids, Suffolk, Va., was diluted in a 114 liter polyethylene container by adding 17.2 kg of tap water and mixing for minutes with the Lightnin Mixer used to prepare Coating "D". 16.5 g of Surfynol ®440 was then added to the diluted solution and the mixture was mixed for 10 minutes at low speed to avoid generating foam. The solution was clear in appearance, with most of the surfactant visible as a second, undissolved phase. The solution had a Brookfield viscosity of 140 cps at 21° C., and the solution contained 10.7% solids as determined by the Model AVC-80 Moisture/Solids Analyzer.

Coating "G"

37.8 kg of hot tap water (57° C.) was placed in a 114 liter polyethylene container fitted with a Lightnin Mixer in the same manner used to prepare Coating "D". 19.9 kg of Nitrox ® sodium nitrate (available from Chilean Nitrate Corp., Norfolk, Va.) was added slowly to the water which was mixed at a speed where a vortex was just forming. 302 g of Surfynol ®440 was then added to the salt solution, and mixing was continued at the same speed for 10 minutes. The solution was clear and colorless, with most of the surfactant visible as a second, undissolved phase. The solution had a Brookfield viscosity of 16 cps at 38° C. and contained 35.2% solids as determined by the Model AVC-80 Moisture/Solids Analyzer.

EXAMPLE 1

This example was carried out in duplicate to produce two dielectric papers as follows:

Coating "A" was used to coat a bleached Kraft base paper with a basis weight of 52.1 g/m$^2$ and a thickness of 66 micrometers (microns) using a No. zero Meyer rod. The coating was then dried in an air foil oven with the exiting web temperature maintained at 200°±5° F. The resulting coating was colorless and was shown to have a coating weight of 2.1 g/m$^2$.

Coating "C" was used to apply a second layer over the already coated and dried conductive clay layer on paper, again using a No. zero Meyer rod. The coated paper was dried in an air foil oven with the exit paper temperature being maintained at 200°±5° F. The resulting coated paper had a total coat weight of 9.1 g/m$^2$ and was white in color.

Coating "C" was used again to apply a third layer over the already coated and dried conductive clay layer on paper using a No. zero Meyer rod. The coated paper was dried in an air foil oven with the exit paper temperature being maintained at 190°±5° F. The resulting coated paper had a total coat weight of 12.3 g/m$^2$ and was white in color.

Coating "D" was then applied to the uncoated, second surface of the paper using a No. zero Meyer rod, and dried as described above with the exiting paper temperature maintained at 154°±2° F. The resulting moisture content of the web was 8.70% and the added coat weight was 5.2 g/m$^2$.

The resulting fully coated paper had a total coat weight of 17.5 g/m$^2$ and was equilibrated separately at two conditions in an environmental chamber: i.e., one fully coated paper was equilibrated at 25% relative humidity (R.H.)/70° F. and the second fully coated paper was equilibrated at 65% R.H./70° F. for two hours. Each paper was then printed in a Versatec Model 7422 electrostatic plotter provided by Zerox Engineering Systems, Santa Clara, Calif. A pattern suitable for measurement across the full 22 inch width of the media was selected by arranging for all imaging styli to fire, thereby generating a latent electrostatic image potentially capable of full development with liquid toner (Versatec ® type H). The plotter was set at 58% of maximum contrast. Image reflection densities were measured at eight equally spaced intervals using a MacBeth Model RD-517 reflection densitometer fitted with a Wratten No. 106 filter. The results are provided in Table 1.

EXAMPLE 2

A dielectric paper was prepared in duplicate according to the procedure outlined in Example 1 except that the second surface of the paper was not coated with coating "D". The moisture content of the exiting web following application of the third layer was 1.69%. The paper was equilibrated in the environmental chamber at the same time as and in the same manner as Example 1 and printed in the same way as Example 1. The reflection densities were measured in the same manner as for Example 1. The results are provided in Table 1.

EXAMPLE 3

A dielectric paper was prepared in duplicate as follows:

Coating "C" was used to coat a bleached Kraft base paper with a basis weight of 52.1 g/m$^2$ using a No. zero Meyer rod. The coating was then dried in the same manner described for coating the first coating layer in Example 1, with the same exiting web temperature. The resulting coating was white and was shown to have a coating weight of 7.1 g/m$^2$.

Coating "C" was again used to apply a second layer over the already coated and dried paper, using a No. 3 Meyer rod. The second layer was dried in the same manner described for coating the second coating layer of Example 1, with the same exiting web temperature. The resulting coated paper had a total coat weight of 12.1 g/m$^2$ and was white in color.

Coating "D" was then applied to the uncoated, second surface of the paper using a No. zero Meyer rod, and dried as described in Example 1, with the exiting paper temperature maintained at 156°±2° F. The resulting moisture content of the paper was 7.6%, and the added coat weight was 5.5 g/m$^2$. The resulting coated paper had a total coat weight of 17.6 g/m2. The paper was equilibrated and printed. Reflection densities were measured in the same manner as described in Example 1. The results are provided in Table 1.

EXAMPLE 4

A dielectric paper was prepared in duplicate as follows:

Coating "B" was used to coat the base paper of Example 1 using a No. zero Meyer rod. The coating was then dried in an air foil oven with the exiting web temperature maintained at 151°±2° F. The resulting coating was colorless and was shown to have a coating weight of 4.4 g/m$^2$.

Coating "C" was used to apply a second layer over the already coated and dried conductive clay layer on paper, again using a No. zero Meyer rod, followed by drying in an air foil oven with the exit paper temperature being maintained at 200°±5° F. The resulting coated paper had a total coat weight of 10 9 g/m$^2$ and was white in color.

Coating "C" was used to apply a third layer over the already coated and dried conductive clay layer on paper, again using a No. zero Meyer rod, followed by drying in an air foil oven with the exit paper temperature being maintained at 190°±5° F. The resulting coated paper had a total coat weight of 15.3 g/m$^2$ and was white in color.

Coating "D" was then applied to the uncoated, second surface of the paper using a No. zero Meyer rod, and dried as in Example 1 with the exiting web temperature maintained at 151°±2° F. The resulting moisture content of the web was 8.0% and the added coat weight was 4.6 g/m$^2$. The resulting coated paper had a total coat weight of 19.9 g/m$^2$.

The paper was equilibrated and printed as described in Example 1. Reflection densities measured in the same manner described in Example 1. The results are provided in Table 1.

EXAMPLE 5

A dielectric paper was prepared in duplicate according to the procedure outlined in Example 1 except that coating "E" was applied to the uncoated, second surface as the paper using a No. zero Meyer rod. The coated paper was dried as in Example 1 with the exiting web temperature maintained at 161°±2° F. The resulting moisture content of the paper was 6.6% and the added coat weight was 4.6 g/m$^2$.

The paper was equilibrated and printed, with reflection densities measured in the same manner as for Example 1. The results are provided in Table 1.

EXAMPLE 6

A dielectric paper was prepared in duplicate according to the procedure outlined in Example 1 except that coating "F" was applied to the uncoated, second surface of the paper using a No. 12 Meyer rod. The coated paper was dried as in Example 1, with the exiting web temperature maintained at 159°±2° F. The resulting moisture content of the paper was 6.6% and the added coat weight was 2.6 g/m$^2$.

The paper was equilibrated and printed, with reflection densities measured in the same manner as for Example 1. The results are provided in Table 1.

EXAMPLE 7

A dielectric paper was prepared in duplicate according to the procedure outlined in Example 1 except that coating "G" was applied to the uncoated, second surface of the paper using a No. zero Meyer rod. The coated paper was dried as in Example 1, with the exiting web temperature maintained at 156°±2° F. The resulting moisture content of the paper was 8.0% and the added coat weight was 8.0 g/m$^2$.

The paper was equilibrated and printed with reflection densities measured in the same manner as for Example 1. The results are provided in Table 1.

EXAMPLE 8

A dielectric paper was prepared in duplicate according to the procedure outlined in Example 4 except that coating "E" was applied to the paper's second, uncoated surface using a No. zero Meyer rod. The coated paper was dried as in Example 1, with the exiting web temperature maintained at 158°±2° F. The resulting moisture content of the paper was 6.7% and the added coat weight was 4.8 g/m$^2$.

The paper was equilibrated and printed with reflection densities measured in the same manner as for Example 1. The results are provided in Table 1.

TABLE 1

| | EXAMPLES | | | | | | | |
|---|---|---|---|---|---|---|---|---|
| | 1 | 2 (Control) | 3 (Control) | 4 | 5 | 6 | 7 | 8 |
| RD[1] at 25% RH[3] | 1.23 | 0.16 | 1.00 | 1.13 | 1.31 | 1.32 | 1.43 | 1.40 |
| Uniformity[2] at 25% RH[3] | U | M++ | M+ | U | M | M | U+ | U |
| RD[1] at 65% RH[3] | 0.92 | 0.53 | 1.0 | 0.79 | 1.24 | 1.47 | 1.47 | 1.21 |
| Uniformity[2] at 65% RH[3] | U | M++ | M | U | U | U | U+ | M |

[1]Reflection Density Normalized around Example 3 (Control)
[2]U+ Very smooth and uniform maximum density (Dmax)
U Smooth and fairly uniform Dmax
M Moderately mottled Dmax
M+ Severely mottled Dmax
M++ Image badly broken up
[3]Relative Humidity at 70° F.

What is claimed is:

1. An electrostatic recording media comprising:

(a) a support having first and second surfaces;

(b) a conductive clay layer on the first surface of the support; wherein the conductive clay is present in the amount of at least 95% by weight based on the total weight of the layer components;

(c) at least one dielectric layer present on the conductive clay layer; and (d) a non-clay conductivizing agent incorporated into the support from the second surface.

2. The electrostatic recording media of claim 1 wherein the support is selected from the group consisting of paper, spun bonded polyester, and spun bonded olefin.

3. The electrostatic recording media of claim 2 wherein the paper is selected from the group consisting of 100% bleached hardwood Kraft paper, bleached softwood Kraft paper, mixture of 100% bleached hardwood Kraft paper and bleached softwood Kraft paper, wood free cotton vellum, and translucent wood-containing paper.

4. The electrostatic recording media of claim 1 wherein the conductive clay consists essentially of a synthetic hectorite clay.

5. The electrostatic recording media of claim 1 wherein the conductive clay consists essentially of a montmorillonite clay.

6. The electrostatic recording media of claim 1 wherein the dielectric layer comprises a polymeric material in an aqueous dispersion or solution.

7. The electrostatic recording media of claim 6 wherein the polymeric material consists essentially of an acrylic resin.

8. The electrostatic recording media of claim 6 wherein the dielectric layer further comprises at least one pigment.

9. The electrostatic recording media of claim 8 wherein the pigment is present in the amount of 10 to 60% by weight based on the weight of the dielectric layer,, on a dry basis.

10. The electrostatic recording media of claim 1 further comprising an additional dielectric layer present on layer (c).

11. The electrostatic recording media of claim 10 wherein the additional dielectric layer has the same dielectric composition as dielectric layer (c).

12. The electrostatic recording media of claim 10 wherein the additional dielectric layer has a different dielectric composition from dielectric layer (c).

13. The electrostatic recording media of claim 1 wherein the non-clay conductivizing agent is selected from the group consisting of inorganic salts and electroconductive polymers.

14. The electrostatic recording media of claim 13 wherein the electroconductive polymer is selected from the group consisting of nonionic polymers, anionic polymers and cationic polymers.

15. The electrostatic recording media of claim 13 wherein the electroconductive polymer is sodium polystyrene sulfonate.

16. The electrostatic recording media of claim 13 wherein the electroconductive polymer is polydiallyldimethyl ammonium chloride.

17. The electrostatic recording media of claim 1 wherein the non-clay conductivizing agent is present in the amount of 20 to 100% by weight based on the total weight of the non-clay conductivizing agent containing layer components.

* * * * *